United States Patent
Ueda et al.

(10) Patent No.: US 12,499,709 B2
(45) Date of Patent: Dec. 16, 2025

(54) INFORMATION PROCESSING DEVICE FOR DETERMINING MOTION SICKNESS OF AN ANIMAL

(71) Applicant: SUBARU CORPORATION, Tokyo (JP)

(72) Inventors: Takuya Ueda, Tokyo (JP); Kou Sasaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 294 days.

(21) Appl. No.: 18/121,889

(22) Filed: Mar. 15, 2023

(65) Prior Publication Data

US 2023/0326250 A1 Oct. 12, 2023

(30) Foreign Application Priority Data

Mar. 23, 2022 (JP) .................................. 2022-046268

(51) Int. Cl.
*G06V 40/20* (2022.01)
*A01K 29/00* (2006.01)
*G06V 20/59* (2022.01)

(52) U.S. Cl.
CPC ............ *G06V 40/20* (2022.01); *A01K 29/005* (2013.01)

(58) Field of Classification Search
None
See application file for complete search history.

(56) References Cited

U.S. PATENT DOCUMENTS

| 8,189,825 B2 * | 5/2012 | Breed ...................... H04R 5/02 |
| | | 381/86 |
| 2019/0047498 A1 * | 2/2019 | Alcaidinho ........ B60H 1/00742 |
| 2020/0108700 A1 * | 4/2020 | Flanigan ................... B60J 3/04 |

(Continued)

FOREIGN PATENT DOCUMENTS

| JP | 2013197771 A | * | 9/2013 | |
| JP | 2020-29210 A | | 2/2020 | |
| WO | WO-2021253953 A1 | * | 12/2021 | ................ B60J 3/04 |

OTHER PUBLICATIONS

Miller, Diana Beth. How to Prevent and Treat Your Dog's Car Sickness, Nov. 1, 2021, https://topdogtips.com/dog-car-sickness/. topdogtips.com. (Year: 2021).*

(Continued)

*Primary Examiner* — Amandeep Saini
*Assistant Examiner* — Caroline Tabancay Duffy
(74) *Attorney, Agent, or Firm* — TROUTMAN PEPPER LOCKE LLP

(57) ABSTRACT

An information processing device is configured to determine whether an animal is suffering from motion sickness. The animal is an animal other than an occupant who rides in a mobile object. The information processing device includes one or more processors, and one or more memories communicably coupled to the one or more processors. The one or more processors are configured to acquire an image captured by a camera configured to capture an image of the animal. The one or more processors are configured to, based on behavior data of the animal, determine whether the animal is suffering from motion sickness. The behavior data is externally observable from the captured image.

4 Claims, 7 Drawing Sheets

(56) References Cited

U.S. PATENT DOCUMENTS

2021/0031789 A1\* 2/2021 Moriura ................ A61B 10/00
2022/0087229 A1\* 3/2022 Wernimont ........... A61B 5/1118

OTHER PUBLICATIONS

Office Action issued in Japanese Application No. 2022-046268 dated Oct. 21, 2025 (including English translation).

"Supervised by a Veterinarian, can you improve dog's car sickness? Introduction of symptoms, measures, and how toget, used to it", Inu no Kimochi Web Magazine [online] Jan. 7, 2022 (including English translation).

"What are the three causes of car sickness in dogs? Let's enjoy driving by knowing the symptoms and countermeasures"!, Honda Dog [online] Jun. 18, 2021 (including English translation).

"Car sickness of a dog that I want to do something about. Prevention and countermeasure?", Vet's Eye [online]. Jun. 7, 2018 (including English translation).

Supervised by a veterinarian [Driving with my dog] What should I do for car sickness and rest? Precautions, points, and recommended spots are also introduced With [online], Dec. 13, 2021 (including English translation).

\* cited by examiner

INFORMATION PROCESSING DEVICE FOR DETERMINING MOTION SICKNESS OF AN ANIMAL

CROSS-REFERENCE TO RELATED APPLICATION

The present application claims priority from Japanese Patent Application No. 2022-046268 filed on Mar. 23, 2022, the entire contents of which are hereby incorporated by reference.

BACKGROUND

The disclosure relates to an information processing device configured to determine whether an animal is suffering from motion sickness.

Recent years have seen increasing attention focused on vehicle ride comfort. It appears that a demand exists for vehicles that offer a comfortable ride to pets as well as to humans. Since pets are unable to speak, few indicators exist to measure the physical condition of pets. In this regard, Japanese Unexamined Patent Application Publication (JP-A) No. 2020-029210 discloses a technique that, based on a biological signal, determines whether an occupant or pet in a vehicle is suffering from car sickness. The biological signal includes one or more of the following pieces of information: vital signs such as blood pressure, pulse rate, body temperature, and perspiration; reflexes such as chemoreflexes, physical reflexes, and electrical reflexes; and voluntary movements.

SUMMARY

An aspect of the disclosure provides an information processing device configured to determine whether an animal is suffering from motion sickness. The animal is an animal other than an occupant who rides in a mobile object. The information processing device includes one or more processors, and one or more memories communicably coupled to the one or more processors. The one or more processors are configured to acquire an image captured by a camera configured to capture an image of the animal. The one or more processors are configured to, based on behavior data of the animal, determine whether the animal is suffering from motion sickness. The behavior data is externally observable from the captured image.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

The technique described in JP-A No. 2020-029210 is directed to determining, based on a biological signal, whether a pet is suffering from car sickness, in the same manner as when determining whether a vehicle occupant is suffering from car sickness. It is believed that when an animal is suffering from motion sickness, this manifests itself in a particular behavior of the animal. It is thus expected that establishing a technique for determining, based on a behavior of an animal, whether the animal is suffering from motion sickness would enable more accurate determination of whether the animal is suffering from motion sickness.

It is desirable to provide an information processing device capable of, based on a behavior of an animal other than an occupant who rides in a mobile object, determining whether the animal is suffering from motion sickness.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First, reference is made below to an exemplary configuration of a system including an information processing device according to the embodiment.

Figure 1:
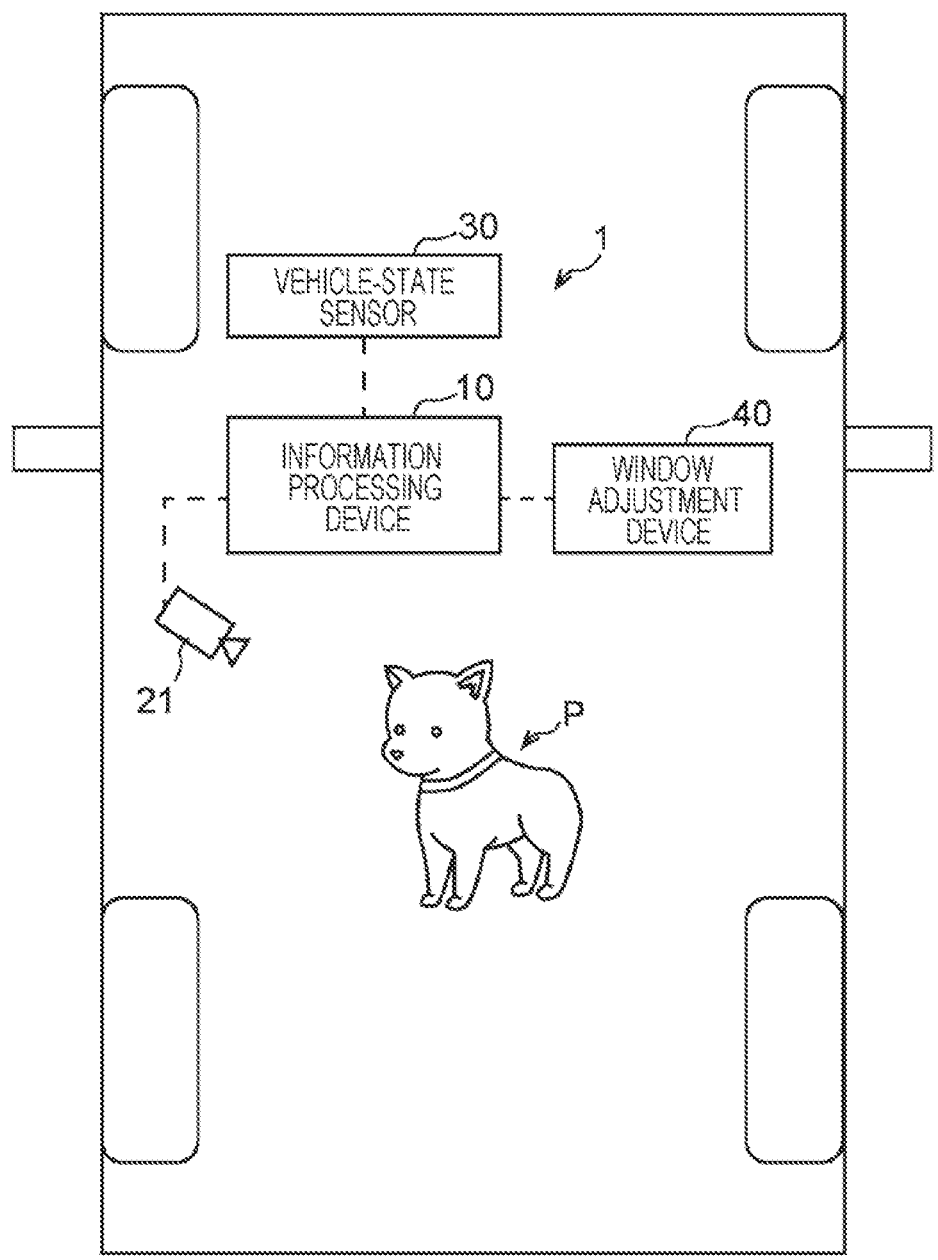
FIG. 1 illustrates an exemplary configuration of a system including an information processing device according to an embodiment of the disclosure.

FIG. 1 illustrates an exemplary configuration of a system 1 incorporated in a vehicle. In one embodiment, the vehicle may serve as a "mobile object". The system 1 is configured to determine whether an animal P is suffering from motion sickness, and perform an operation that reduces the motion sickness. The illustrated system 1 includes an information processing device 10, a camera 21, a vehicle-state sensor 30, and a window adjustment device 40.

The information processing device 10 serves to, through execution of a computer program by one or more processors such as central processing units (CPUs), determine whether the animal P is suffering from motion sickness. According to the embodiment, the information processing device 10 serves to execute a process that reduces motion sickness in the animal P. The computer program is a computer program for causing the one or more processors to execute an operation (to be described later) that is to be executed by the information processing device 10. The computer program to be executed by the one or more processors may be recorded in a recording medium included in the information processing device 10. In one embodiment, the recording medium may serve as a "memory". Alternatively, the computer program may be recorded in a recording medium built in the information processing device 10, or may be recorded in any recording medium capable of being externally added to the information processing device 10.

Exemplary recording media configured to record a computer program may include: magnetic media such as hard disks, floppy disks, and magnetic tapes; optical recording media such as compact disk read only memories (CD-ROMs), digital versatile disks (DVDs), and Blu-rays (registered trademark); magneto-optical media such as floptical disks; memory devices such as random access memories (RAMs) and read-only memories (ROMs); flash memories such as universal serial buses (USBs) and solid state drives (SSDs); and other media capable of storing the program.

The camera 21 includes one or more cameras that generate a captured image by capturing an image of the animal P in the cabin of a vehicle. The camera 21 includes an image sensor such as a charged-coupled device (CCD) or a complementary metal-oxide-semiconductor (CMOS). The camera 21 transmits a generated captured image to the information processing device 10. The camera 21 may be mounted in the cabin, or may be included in a mobile device such as a smartphone.

The vehicle-state sensor 30 includes one or more sensors that detect information that allows determination of whether a vehicle is in motion or at rest. Although the vehicle-state sensor 30 may be, for example, any one of an accelerator position sensor, a vehicle speed sensor, and an acceleration sensor, the vehicle-state sensor 30 may be a sensor other than those mentioned above. Such sensors detect a behavior of the vehicle that allows determination of whether the vehicle is in motion or at rest, such as accelerator position, vehicle speed, forward/backward acceleration, or lateral acceleration.

The window adjustment device 40 drives, in accordance with an operation command output from the information processing device 10, a device disposed at or in a window of the vehicle to thereby reduce motion sickness in the animal P. The window adjustment device 40 will be described later in detail.

Figure 2:
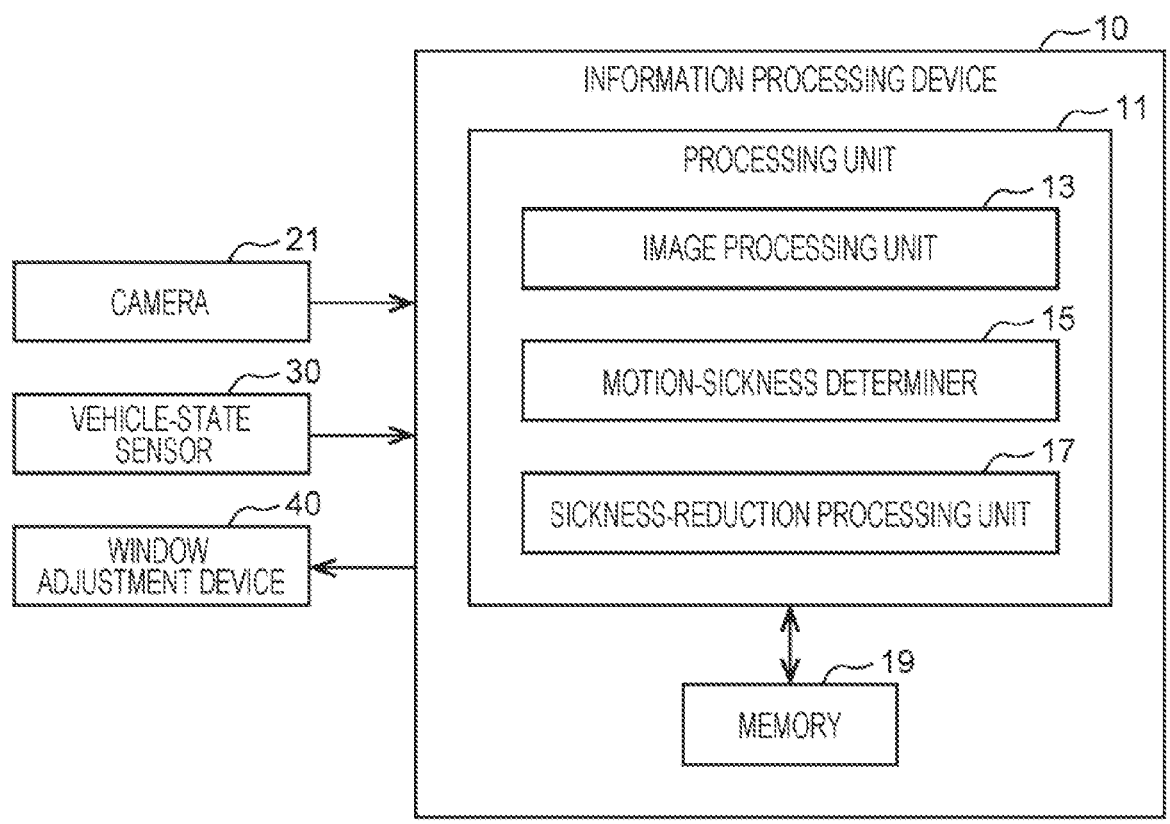
FIG. 2 is a block diagram illustrating an exemplary configuration of the information processing device according to the embodiment.

Reference is now made to an exemplary configuration of the information processing device 10 according to the embodiment. FIG. 2 is a block diagram illustrating an exemplary configuration of the information processing device 10.

The information processing device 10 includes a processing unit 11, and a memory 19. The processing unit 11 includes one or more processors such as CPUs. The processing unit 11 may, in part or in whole, be implemented by an updatable component such as firmware, or may be a program module or other component to be executed by a command from a CPU or other component. The memory 19 is implemented by a RAM, a ROM, or other memory. The memory 19 is communicably coupled to the processing unit 11. There is no particular limitation on the number of such memories 19 or the type of the memory 19. The memory 19 stores, for example, a computer program to be executed by the processing unit 11, or information such as various parameters used for computations, detection data, or computation results.

As illustrated in FIG. 2, the processing unit 11 of the information processing device 10 includes an image processing unit 13, a motion-sickness determiner 15, and a sickness-reduction processing unit 17. These components are functions to be implemented by execution of a computer program by a processor such as a CPU. It is to be noted, however, that these components may partially include an analog circuit.

Reference is now made first to the functions of various components of the processing unit 11, and then to exemplary processes and operations. The following description assumes that the animal P is a dog.

The image processing unit 13 processes a captured image transmitted from the camera 21. The image processing unit 13 thus recognizes the animal P, and acquires behavior data of the animal. For example, the image processing unit 13 applies edge processing to the captured image, and extracts edges where brightness changes abruptly. The image processing unit 13 also compares the extracted edges with pre-stored features of an animal, and recognizes the animal P by use of pattern matching or other methods. Alternatively, the image processing unit 13 may recognize the animal P by recognizing the animal's face.

The image processing unit 13 acquires behavior data of the recognized animal. The behavior data of the animal represents behavior data that can be detected based on the image captured by the camera 21, and can be determined by external observation of the animal P. The behavior data to be acquired includes, for example, one or more of the following pieces of data: the amount of movement of (distance moved by) the animal P; the number of movements made by the animal P; and the duration of movement of the animal P. The amount of movement is the total distance moved, and can be determined by conversion from the distance moved (pixel size) within the captured image. If the animal P is walking back and forth from one spot to another, the total distance walked is counted. As for the number of movements, for example, a behavior where the animal P gets up from a lying down position, moves, and then lies down again is counted as a single movement made by the animal P. The duration of movement is counted as, for example, the duration of movement excluding the time when the animal P is in a stationary state.

The behavior data to be detected may include one or both of the number of yawns and the amount of drool. The amount of drool may be the number of drools. Other exemplary behavior data to be detected may include any behavior data that allows determination of a behavior in which a sign of motion sickness appears, and that is previously determined in accordance with the kind of the animal P. For example, in a case where the animal P is a dog, exemplary behavior data may include data such as the number of cries made by the dog or the orientation of the tail of the dog. The orientation of the tail refers to, for example, whether the tail is pointed up or down.

The image processing unit 13 records the detected behavior data as data per unit time. The unit time may be set to any suitable value, for example, 5 seconds, 10 seconds, or 30 seconds. In recording detected behavior data at this time, the image processing unit 13 distinguishes, in accordance with detection data acquired from the vehicle-state sensor 30, whether the detected behavior data represents behavior data detected when the vehicle is in motion or represents behavior data detected when the vehicle is at rest.

The motion-sickness determiner 15 determines, based on behavior data of the animal P detected by the image processing unit 13, whether the animal P is suffering from motion sickness. In one example, the motion-sickness determiner 15 compares the following pieces of pre-recorded behavior data: behavior data detected when the vehicle is at rest; and behavior data detected when the vehicle is in motion. In a case where a particular behavior detected when the vehicle is in motion is different from the corresponding behavior detected when the vehicle is at rest, the motion-sickness determiner 15 determines that the animal P is suffering from motion sickness. For example, the motion-sickness determiner 15 determines that the animal P is suffering from motion sickness, in a case where a value detected when the vehicle is in motion has increased by a predetermined amount or more relative to the corresponding value detected when the vehicle is at rest, the value being one of the amount of movement of the animal P, the number of movements made by the animal P, and the duration of movement of the animal P. This is because the animal P tends to become restless when suffering from motion sickness. The determination of whether the above-mentioned value has increased by a predetermined amount or more is made, for example, by determining whether the ratio of increase in the value per unit time is greater than or equal to a predetermined threshold, or by determining whether the value has increased by a predetermined threshold or more.

The motion-sickness determiner 15 may, in a case where one of the number of yawns, the number of cries, and the amount of drool indicates an abnormal value, determine that the animal P is suffering from motion sickness. This is because the animal P tends to exhibit an increased number of yawns, an increased number of cries, or an increased amount of drool when suffering from motion sickness. For example, the motion-sickness determiner 15 monitors the number of yawns, the number of cries, or the amount of drool on a time series basis, and when any one of these values has exceeded a predetermined threshold for a predetermined amount of time or more, determines that the animal P is suffering from motion sickness. The motion-sickness determiner 15 may, in a case where the tail of the animal P is pointed down, determine that the animal P is suffering from motion sickness. This is because the tail tends to hang down when the animal P is suffering from motion sickness.

The motion-sickness determiner 15 may, when at least one of the above-mentioned determination conditions is satisfied (yes), determine that the animal P is suffering from motion sickness. Alternatively, the motion-sickness determiner 15 may, when more than a predetermined threshold number of conditions out of the above-mentioned conditions are satisfied, determine that the animal P is suffering from motion sickness.

The sickness-reduction processing unit 17 drives the window adjustment device 40 in a case where the animal P is determined by the motion-sickness determiner 15 to be suffering from motion sickness, and executes a process that reduces the motion sickness in the animal P. In the system 1 according to the embodiment, the sickness-reduction processing unit 17 executes a process that reduces the motion sickness in the animal P through an operation that affects the animal P to a greater degree than an occupant of the vehicle. In one example, the sickness-reduction processing unit 17 drives the window adjustment device 40 in such a way that, while reducing potential interference with driving or comfort of the occupant, a proportion of the surrounding scenery of the vehicle that the animal P perceives as being blocked is greater than a proportion of the surrounding scenery of the vehicle that the occupant perceives as being blocked.

Figure 3:
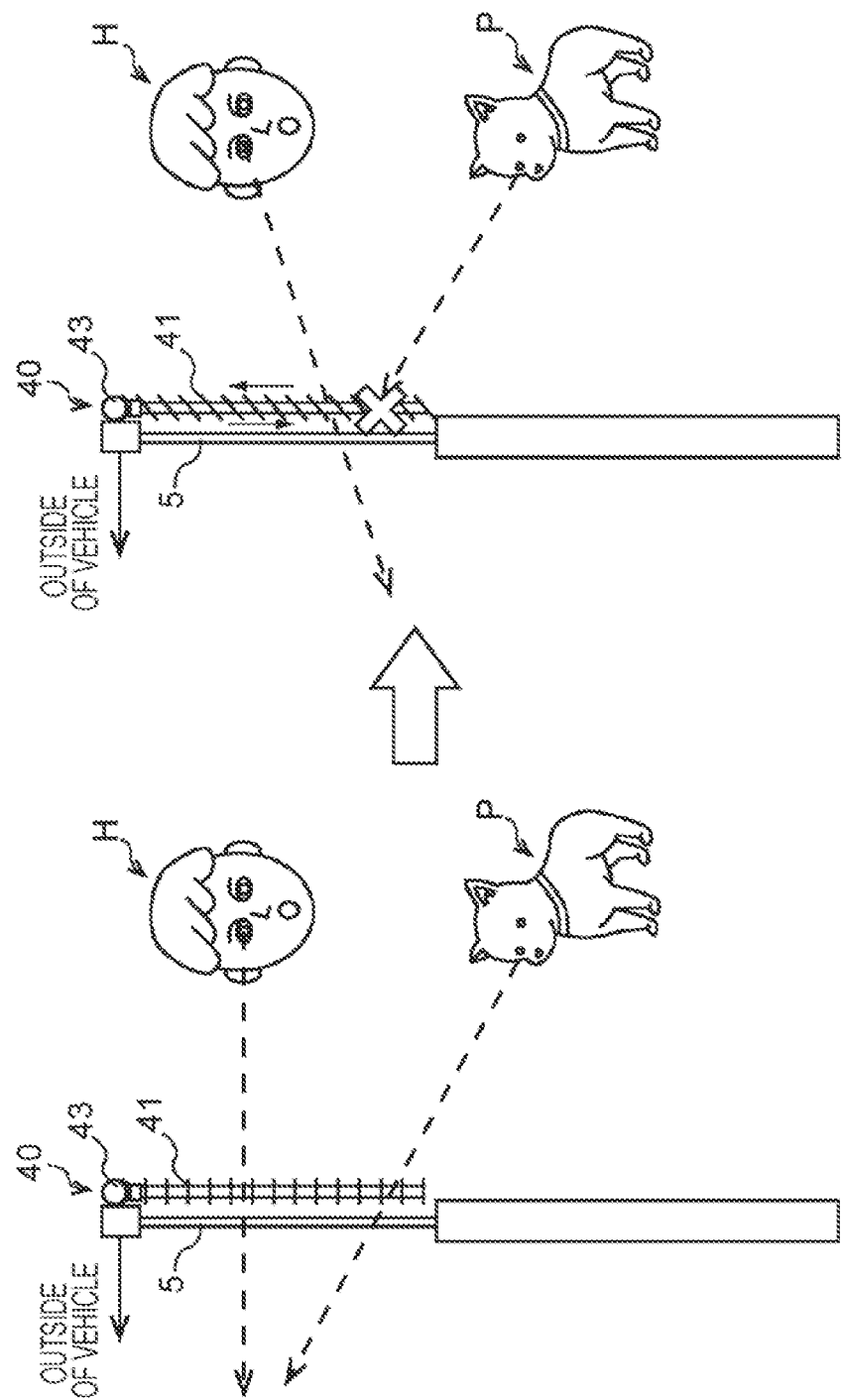
FIG. 3 illustrates an exemplary configuration of a window adjustment device according to the embodiment.

FIG. 3 illustrates an example of the window adjustment device 40. The window adjustment device 40 illustrated in FIG. 3 is implemented as an electric blind device disposed on the cabin side of a side window 5. In one example, the window adjustment device 40 includes a blind 41 with slats, and a motor 43 that causes the angle of the slats to change. It is known that when the animal P is suffering from motion sickness, the motion sickness can be reduced by restricting the field of vision of the animal P. Accordingly, when the animal P is not in a state of motion sickness, the window adjustment device 40 causes the slats of the blind 41 to be oriented horizontally so that the scenery outside the vehicle is visible from an occupant H and the animal P, whereas when the animal P is suffering from motion sickness, the window adjustment device 40 causes the angle of the slats of the blind 41 to change so that the scenery outside the vehicle is visible from the occupant H and that the scenery outside the vehicle is invisible from the animal P. This helps to reduce the motion sickness in the animal P.

Figure 4:
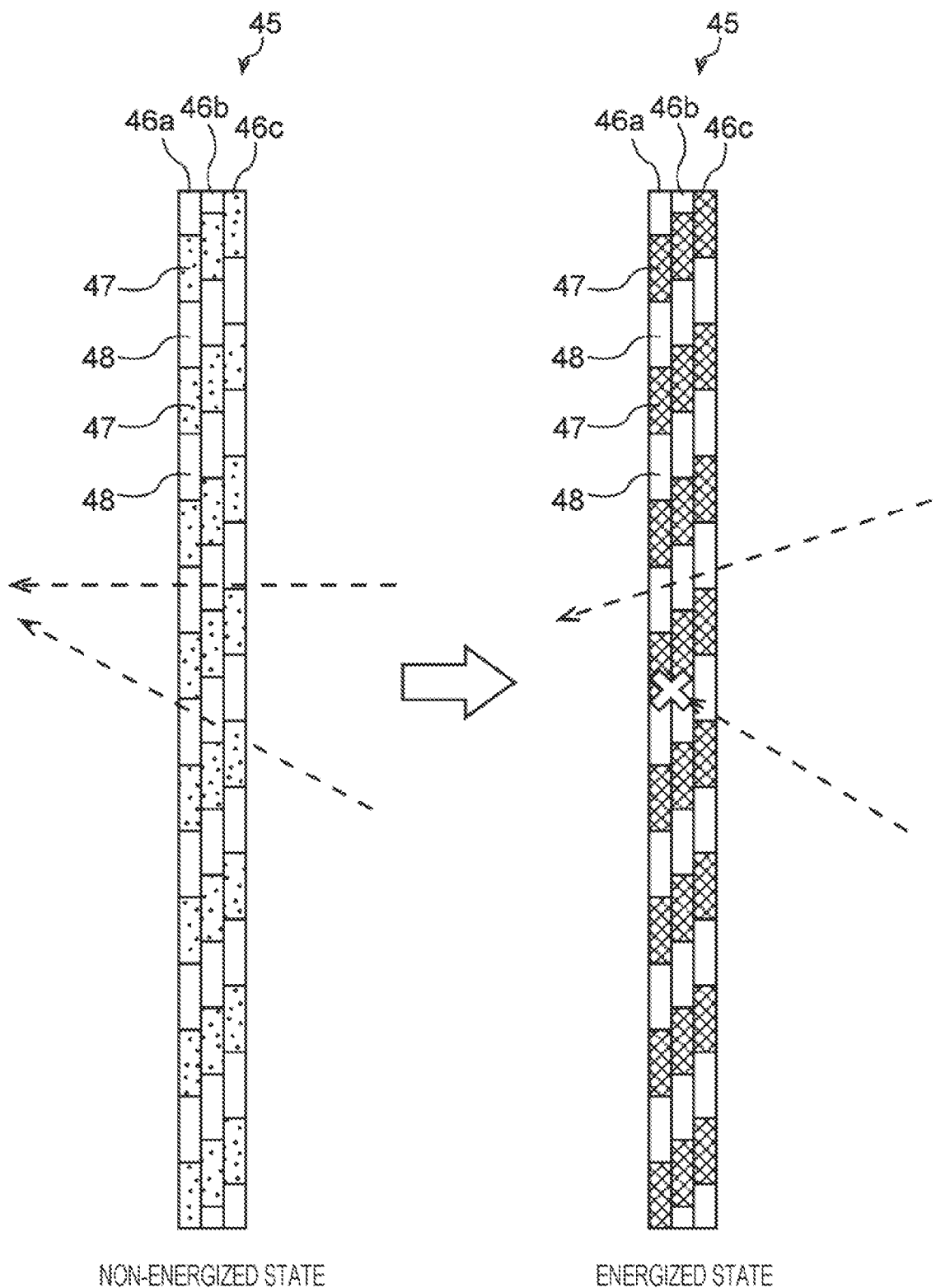
FIG. 4 illustrates another exemplary configuration of the window adjustment device according to the embodiment.

FIG. 4 illustrates a window adjustment device 45 representing another exemplary window adjustment device. The window adjustment device 45 illustrated in FIG. 4 is implemented by using a light control film. The light control film can be switched between transmissive and non-transmissive states by a change in liquid crystal alignment caused by switching of the liquid control film between energized and non-energized states. In one example, the window adjustment device 45 is a laminate of three light control sheets 46a, 46b, and 46c, each of which includes an alternating arrangement of a light control part 47 including a liquid crystal material, and a transmissive part 48 made of a light transmissive material, with the respective light control parts 47 of the three light control sheets 46a, 46b, and 47c being arranged in a slightly staggered relationship to each other. Although three light control sheets are used in this example, any number of light control sheets may be used. When the window adjustment device 45 is in a non-energized state, the light control part 47 as well as the transmissive part 48 are light-transmissive, which allows the scenery outside the vehicle to be visible irrespective of the angle of transmission, that is, the angle of the line of sight.

When the window adjustment device 45 is in an energized state, the liquid crystal material of the light control part 47 changes in liquid crystal alignment, which causes the light control part 47 to become non-transmissive. Due to the slightly staggered arrangement of the respective light control parts 47 of the three light control sheets 46a, 46b, and 46c, the scenery outside the vehicle can be blocked depending on the angle of the line of sight. Accordingly, by designing the positioning of each light control part 47 so that the scenery outside the vehicle is invisible when viewed with the orientation of the line of sight corresponding to the level of the head of the animal P, it is possible to make the scenery outside the vehicle invisible from the animal P. As a result, when the animal P is not in a state of motion sickness, the window adjustment device 45 is not energized, whereas when the animal P is suffering from motion sickness, the window adjustment device 45 is energized so that the scenery outside the vehicle is visible from the occupant H, and that the scenery outside the vehicle is invisible from the animal P. This helps to reduce the motion sickness in the animal P.

In one example, the window adjustment device 45 illustrated in FIG. 4 may be disposed on the cabin side of the window separately from the window. In another example, the window itself may include the light control sheets.

The window adjustment devices 40 and 45 restrict the angle of the line of sight at which the scenery outside the vehicle is visible through the side window 5. This helps to ensure that the surrounding scenery be visible when viewed at the angle of the line of sight from the level of the head of the occupant H, and that the surrounding scenery be invisible when viewed at the angle of the line of sight from the level of the head of the animal P. This helps to reduce the motion sickness in the animal P.

Figure 5:
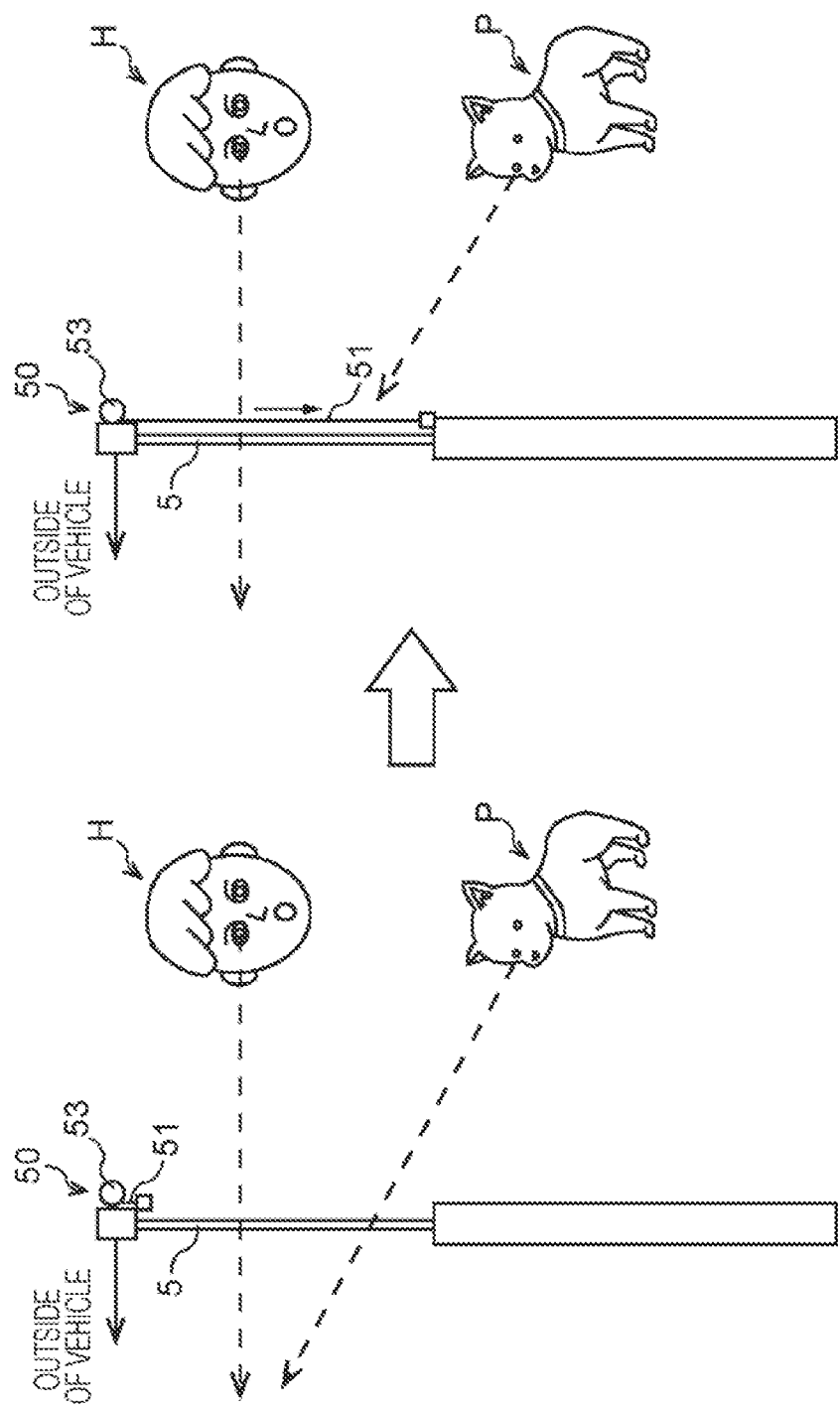
FIG. 5 illustrates another exemplary configuration of the window adjustment device according to the embodiment.

FIG. 5 illustrates a window adjustment device 50 representing still another exemplary window adjustment device.

The window adjustment device 50 illustrated in FIG. 5 is configured to change the color of the window to red or green while maintaining the transmissive property of the window. This exploits the characteristic of animals (dogs, in particular) that red and green colors are invisible but appear gray to animals. The window adjustment device 50 includes a transmissive sheet 51, and a motor 53. The transmissive sheet is light-transmissive and of red or green color. The motor 53 has a wind-up shaft (not illustrated) that is to be rotated in the forward direction or in the reverse direction to thereby wind up or pay out the transmissive sheet 51. The window adjustment device 50 is disposed on the cabin side of the side window 5. When the animal P is not in a state of motion sickness, the transmissive sheet 51 is wound up so that the scenery outside the vehicle is visible from the occupant H and the animal P. When the animal P is suffering from motion sickness, the transmissive sheet 51 is lowered to cover the side window 5 so that the scenery outside the vehicle is visible from the occupant H, and that the scenery outside the vehicle is invisible from the animal P. This restricts the field of vision of the animal P, which helps to reduce motion sickness.

Figure 6:
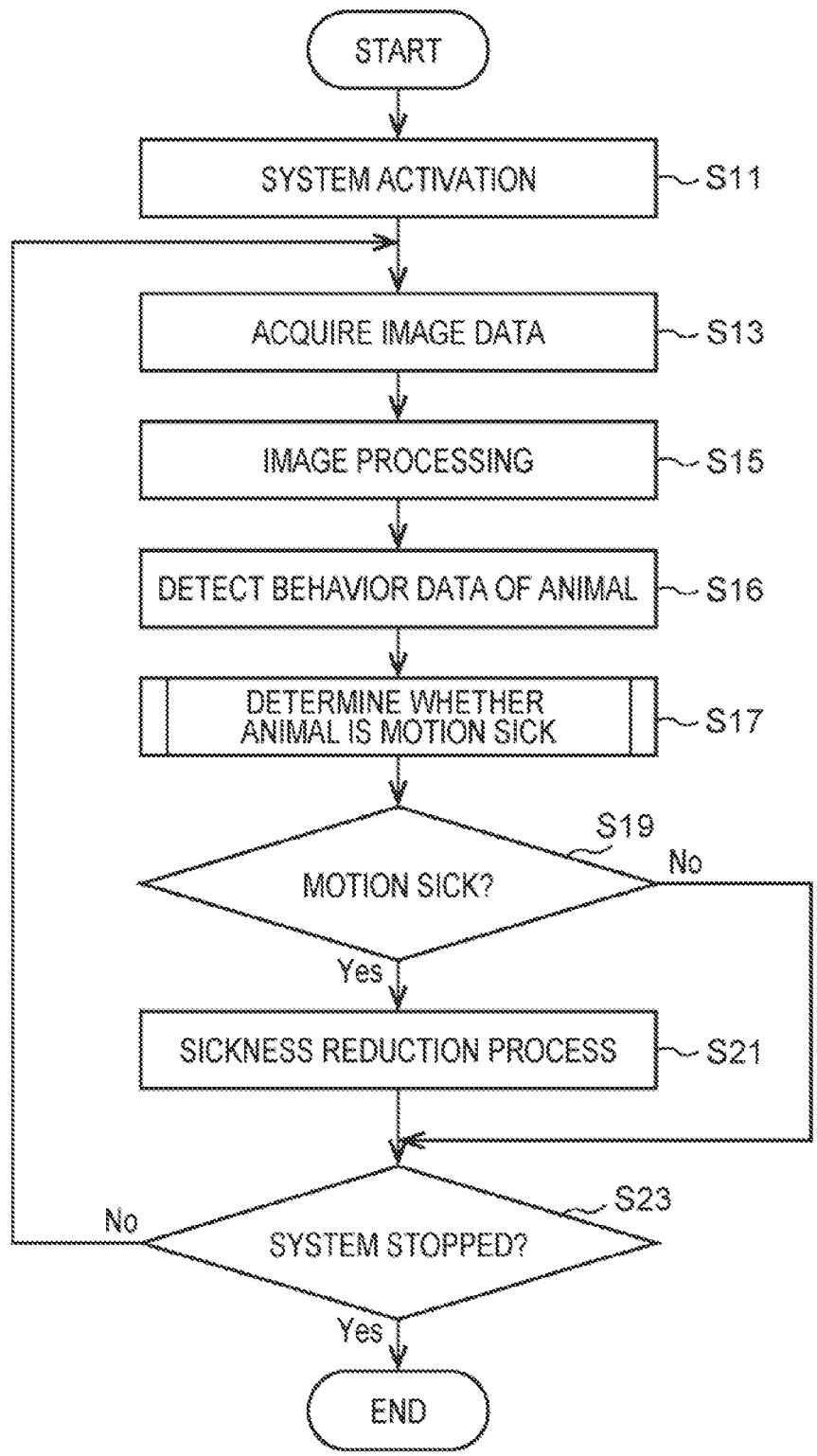
FIG. 6 is a flowchart of a control process to be executed by the information processing device according to the embodiment.

Reference is now made to an exemplary control process to be executed by the information processing device 10 according to the embodiment. FIG. 6 is a flowchart illustrating the main routine of the control process to be executed by the processing unit 11 of the information processing device 10.

First, upon activation of the system (step S11), the image processing unit 13 of the processing unit 11 acquires a captured image that is transmitted from the camera 21 (step S13). Subsequently, the image processing unit 13 executes image processing by using the captured image that has been acquired (step S15). The image processing unit 13 recognizes the animal P by using, for example, pattern matching or other techniques.

Subsequently, the image processing unit 13 acquires behavior data of the recognized animal (step S16). The behavior data of the animal represents behavior data that can be detected based on the image captured by the camera 21, and can be determined by external observation of the animal P. In one example, the image processing unit 13 detects one or more of the following pieces of data: the amount of movement of (distance moved by) the animal P; the number of movements made by the animal P; and the duration of movement of the animal P. In another example, the image processing unit 13 may acquire one or both of the number of yawns and the amount of drool. In still another example, the image processing unit 13 may acquire any behavior data that allows determination of a behavior in which a sign of motion sickness appears, and that is previously determined in accordance with the kind of the animal P.

The image processing unit 13 records the detected behavior data as data per unit time. The unit time may be set to any suitable value, for example, 5 seconds, 10 seconds, or 30 seconds. In recording detected behavior data at this time, the image processing unit 13 distinguishes, in accordance with detection data acquired from the vehicle-state sensor 30, whether the detected behavior data represents behavior data detected when the vehicle is in motion or represents behavior data detected when the vehicle is at rest. The image processing unit 13 acquires a captured image at suitable sampling intervals, and thus recognizes the animal P and also detects and records behavior data of the animal P.

Subsequently, the motion-sickness determiner 15 determines whether the animal P is suffering from motion sickness, based on the behavior data of the animal P detected by the image processing unit 13 (step S17). For example, the motion-sickness determiner 15 compares the following pieces of pre-recorded behavior data: behavior data detected when the vehicle is at rest; and behavior data detected when the vehicle is in motion. In a case where a particular behavior detected when the vehicle is in motion is different from the corresponding behavior detected when the vehicle is at rest, the motion-sickness determiner 15 determines that the animal P is suffering from motion sickness. For example, the motion-sickness determiner 15 determines that the animal P is suffering from motion sickness, in a case where a value detected when the vehicle is in motion has increased by a predetermined amount or more relative to the corresponding value detected when the vehicle is at rest, the value being one of the amount of movement of the animal P, the number of movements made by the animal P, and the duration of movement of the animal P.

The motion-sickness determiner 15 may, in a case where one of the number of yawns, the number of cries, and the amount of drool indicates an abnormal value, determine that the animal P is suffering from motion sickness. For example, the motion-sickness determiner 15 monitors the number of yawns, the number of cries, or the amount of drool on a time series basis, and when any one of these values has exceeded a predetermined threshold for a predetermined amount of time or more, determines that the animal P is suffering from motion sickness. The motion-sickness determiner 15 may, in a case where the tail of the animal P is pointed down, determine that the animal P is suffering from motion sickness.

The motion-sickness determiner 15 may, when at least one of the above-mentioned determination conditions is satisfied (yes), determine that the animal P is suffering from motion sickness. Alternatively, the motion-sickness determiner 15 may, when more than a predetermined threshold number of conditions out of the above-mentioned conditions are satisfied, determine that the animal P is suffering from motion sickness.

Subsequently, the sickness-reduction processing unit 17 determines whether the animal P is suffering from motion sickness, based on the result of the determination made by the motion-sickness determiner 15 (step S19). When the animal P is not suffering from motion sickness (S19/No), the sickness-reduction processing unit 17 proceeds to step S23 without executing a process that reduces motion sickness in the animal P. When the animal P is suffering from motion sickness (S19/Yes), the sickness-reduction processing unit 17 executes a process that reduces motion sickness in the animal P (step S21).

according to the embodiment, to reduce motion sickness in the animal P, the sickness-reduction processing unit 17 drives the window adjustment device 40 to restrict the field of vision of the animal P. At this time, the sickness-reduction processing unit 17 executes a process that reduces the motion sickness in the animal P through an operation that affects the animal P to a greater degree than an occupant of the vehicle. This helps to reduce potential interference with the driving or comfort of the occupant. In one example, the sickness-reduction processing unit 17 changes the angle of the slats of the blind 41 of the window adjustment device 40 illustrated in FIG. 3, so that the scenery outside the vehicle is visible from the occupant and that the scenery outside the vehicle is invisible from the animal P. In this case, the level of the head or eyes of the animal P may be determined based on a captured image transmitted from the camera 21, and the slats of the blind 41 may be set to such an angle that, as seen from the animal P, the scenery outside the vehicle is blocked.

In another example, the sickness-reduction processing unit 17 energizes the window adjustment device 45 illustrated in FIG. 4, so that the scenery outside the vehicle is visible from the occupant whereas the scenery outside the vehicle is invisible from the animal P. In this case, the level of the head or eyes of the animal P may be determined based on a captured image transmitted from the camera 21, and the amount of stagger between the respective light control parts 47 of the three light control sheets 46*a*, 46*b*, and 46*c* may be adjusted in such a way that, as seen from the animal P, the scenery outside the vehicle is blocked. This adjusts the angle of the line of sight at which the scenery outside the vehicle is visible. This helps to ensure with greater reliability that the scenery outside the vehicle be visible from the occupant, and that the scenery outside the vehicle be invisible from the animal P.

In still another example, the transmissive sheet 51 of the window adjustment device 50 illustrated in FIG. 5 is lowered, so that the scenery outside the vehicle is visible from the occupant whereas the scenery outside the vehicle is invisible from the animal P. This restricts the field of vision of the animal P, which helps to reduce the motion sickness in the animal P.

Subsequently, the processing unit 11 determines whether the vehicle's system has stopped (step S23). In a case where the system has not stopped (S23/No), the processing unit 11 returns to step S13, and repeats the execution of the steps mentioned in the foregoing description. In a case where the system has stopped (S23/Yes), the processing unit 11 ends its processing.

As has been described above, the information processing device 10 according to the embodiment is configured to, based on a captured image of an animal other than an occupant who rides in a vehicle, detect externally observable behavior data of the animal and, based on the behavior data, determine whether the animal is suffering from motion sickness. The information processing device 10 is thus capable of, in response to detection of a particular behavior that is observed when the animal is suffering from motion sickness, determining that the animal is suffering from motion sickness.

For example, in determining whether the animal is suffering from motion sickness, the information processing device 10 compares one or more pieces of information detected when the vehicle is at rest, with one or more corresponding pieces of information detected when the vehicle is in motion, the one or more pieces of information being one or more of the following pieces of information: the amount of movement of the animal; the number of movements made by the animal; the duration of movement of the animal; the number of yawns made by the animal; and the number of cries made by the animal. As a result, the determination of whether the animal is suffering from motion sickness is made by external observation. This facilitates detection of motion sickness.

The information processing device 10 according to the embodiment is configured to, in a case where the animal is determined to be suffering from motion sickness, execute a process that reduces the motion sickness through an operation that affects the animal to a greater degree than the occupant. This helps to reduce the motion sickness in the animal without greatly compromising the occupant's driving or comfort.

Although an exemplary embodiment of the disclosure has been described above with reference to the attached drawings, this is not intended to limit the technique according to an embodiment of the disclosure to the details exemplified above. It will be readily appreciated that those of ordinary skill in the technical field to which the disclosure pertains would be able to arrive at various modifications or alterations within the scope of the technical ideas recited in the claims, and such modifications or alterations are also considered to be within the technical scope of the disclosure.

For example, although the above-mentioned embodiment is directed to an example in which motion sickness in an animal is reduced by restricting the field of vision of the animal, the technique according to an embodiment of the disclosure is not limited to the above-mentioned example. The sickness-reduction processing unit may restrict sound audible to an animal to thereby reduce motion sickness in the animal. This is because when an animal is suffering from motion sickness, restricting sound that can be heard by the animal helps to reduce the motion sickness.

Figure 7:
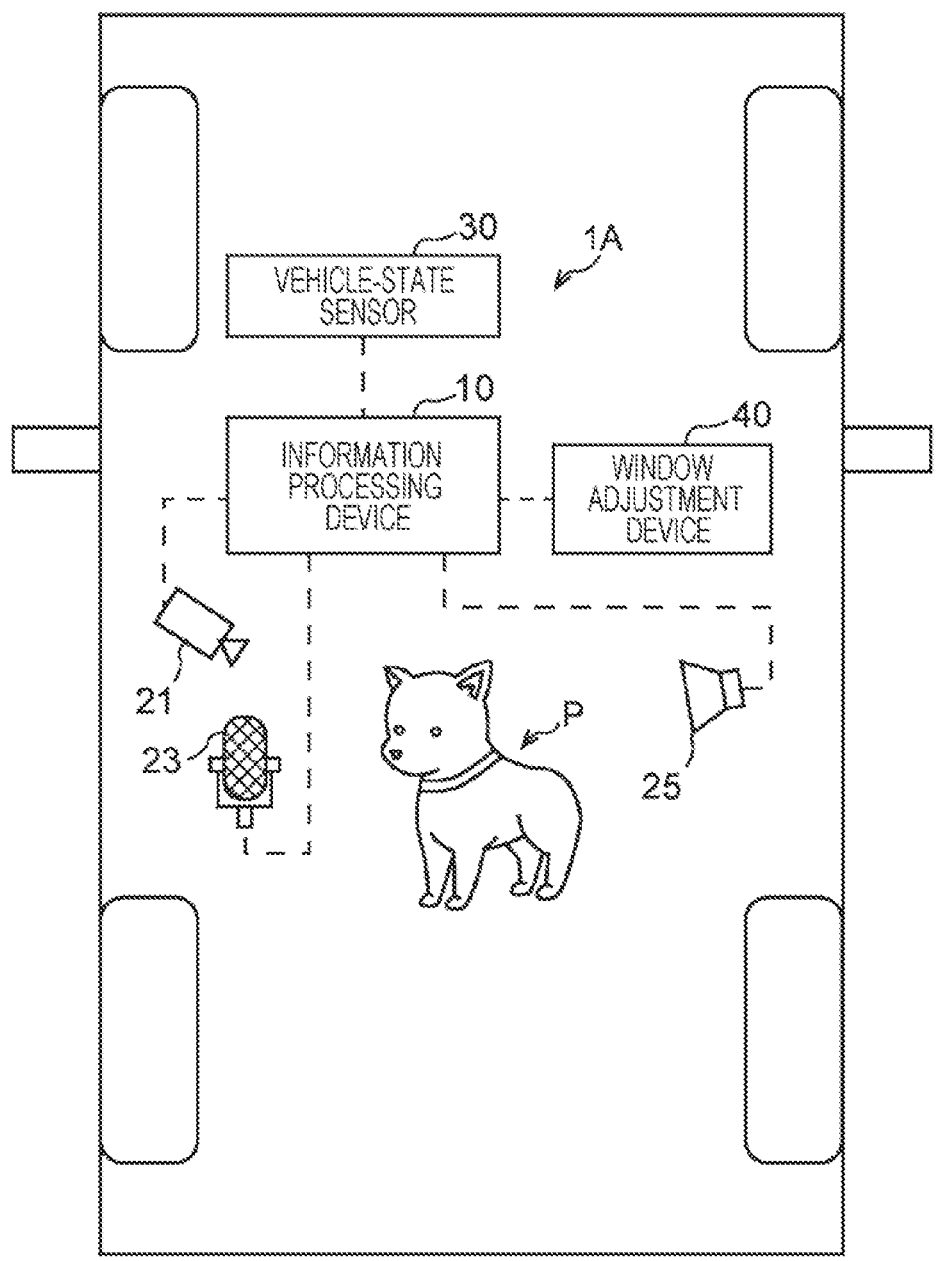
FIG. 7 illustrates another exemplary configuration of a device configured to reduce motion sickness in an animal.

FIG. 7 illustrates an exemplary configuration of a system configured to reduce motion sickness in an animal by restricting sound that can be heard by the animal. As opposed to the system 1 illustrated in FIG. 1, a system 1A illustrated in FIG. 7 includes added features to reduce motion sickness in an animal by restricting sound that can be heard by the animal. The system 1A may be configured to not include the window adjustment device 40. The system 1A includes a microphone 23 that collects sound inside a vehicle, and a speaker 25 that outputs sound. The sickness-reduction processing unit of the information processing device 10 identifies, in a case where an animal is determined to be suffering from motion sickness, sound in a high frequency range above the human audible range from various frequencies of sound collected by the microphone 23, and causes the speaker 25 to output sound in opposite phase to the sound. As a result, sound waves in a high frequency range are attenuated and thus become less audible to the animal. This helps to reduce motion sickness in the animal. In this case, a human occupant perceives no change in audible sound. This helps to reduce a sense of discomfort that the occupant would otherwise feel.

Although the above-mentioned embodiment is directed to an exemplary application of the technique according to an embodiment of the disclosure to a vehicle serving as a mobile object, such a mobile object is not limited to a vehicle but may be any mobile object, such as a train or an aircraft. Although the above-mentioned embodiment is mainly directed to a case where the animal other than the occupant of the mobile object is a pet, the technique according to an embodiment of the disclosure is also applicable to cases where the animal is a non-pet animal such as livestock.

The processing unit 11 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the processing unit 11 including the image processing unit 13, the motion-sickness determiner 15, and the sickness-reduction processing unit 17. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. An information processing device configured to determine whether an animal is suffering from motion sickness, the animal being an animal other than an occupant who rides in a vehicle, the information processing device comprising:
one or more processors; and
one or more memories communicably coupled to the one or more processors,
the one or more processors being configured to
detect whether the vehicle is traveling or stopped based on at least one of accelerator position, vehicle speed, forward or backward acceleration, or lateral acceleration detected by one or more sensors installed in the vehicle, the one or more sensors detecting at least one of the accelerator position, the vehicle speed, the forward or backward acceleration, or the lateral acceleration,
acquire an image captured by a camera configured to capture an image of the animal, and
calculate a first behavior data using the image when detecting the vehicle is traveling and calculate a second behavior data using the image when detecting the vehicle is stopped,
the first and second behavior data including at least one of:
(1) amount, of a movement of the animal, that is a total distance calculated by conversion from a pixel size moved within the image into a distance,
(2) number, of movements of the animal, where the animal gets up from a lying down position, moves, and lies down again is counted as a single movement, or
(3) duration, of the movement of the animal, excluding time when the animal is in a stationary state;
determine that the animal is suffering from motion sickness based on difference between the first behavior data and the second behavior data as a result of comparing the first behavior data with the second behavior data, and
control window adjustment device, installed in the vehicle, configured to restrict a field of vision through a window when determining that the animal is suffering from motion sickness.

2. The information processing device according to claim 1,
wherein the first and second behavior data further include at least one of a number of yawns made by the animal, or a number of cries made by the animal.

3. The information processing device according to claim 1, wherein the one or more processors are configured to,
determine that the animal is suffering from motion sickness when detecting the first behavior data increases more than a predetermined value from the second behavior data.

4. The information processing device according to claim 1, wherein the one or more processors are configured to,
upon determining that the animal is suffering from motion sickness, execute a process of,
restricting a field of vision through a window of the vehicle in a manner such that a proportion of surrounding scenery of the vehicle that the animal perceives as being blocked is greater than a proportion of the surrounding scenery of the vehicle that the occupant perceives as being blocked, or
attenuating a sound wave in a high frequency range above a human audible range to output a sound wave less audible to the animal.

* * * * *